Nov. 29, 1927.
R. G. SANFORD
MOTOR COMPRESSOR
Filed July 22, 1925
1,650,769
2 Sheets-Sheet 2
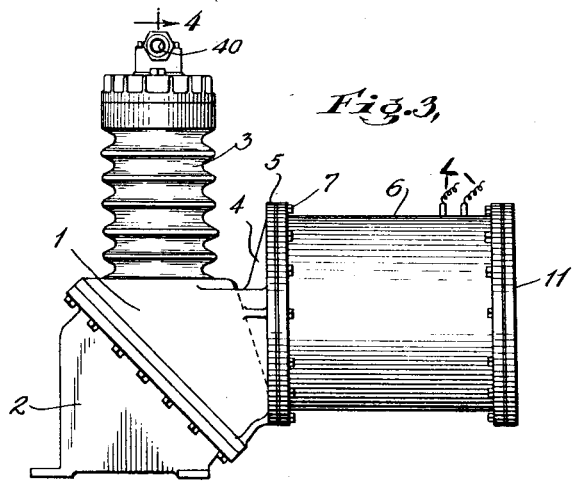
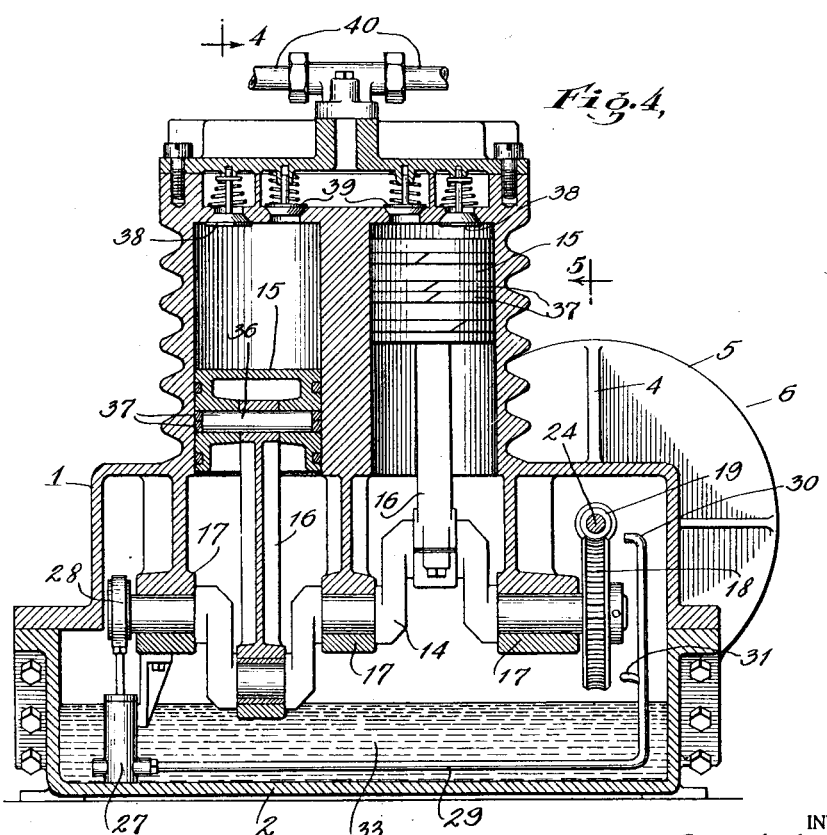
INVENTOR
Robert G. Sanford
BY
Riddle and Marquson
ATTORNEYS.

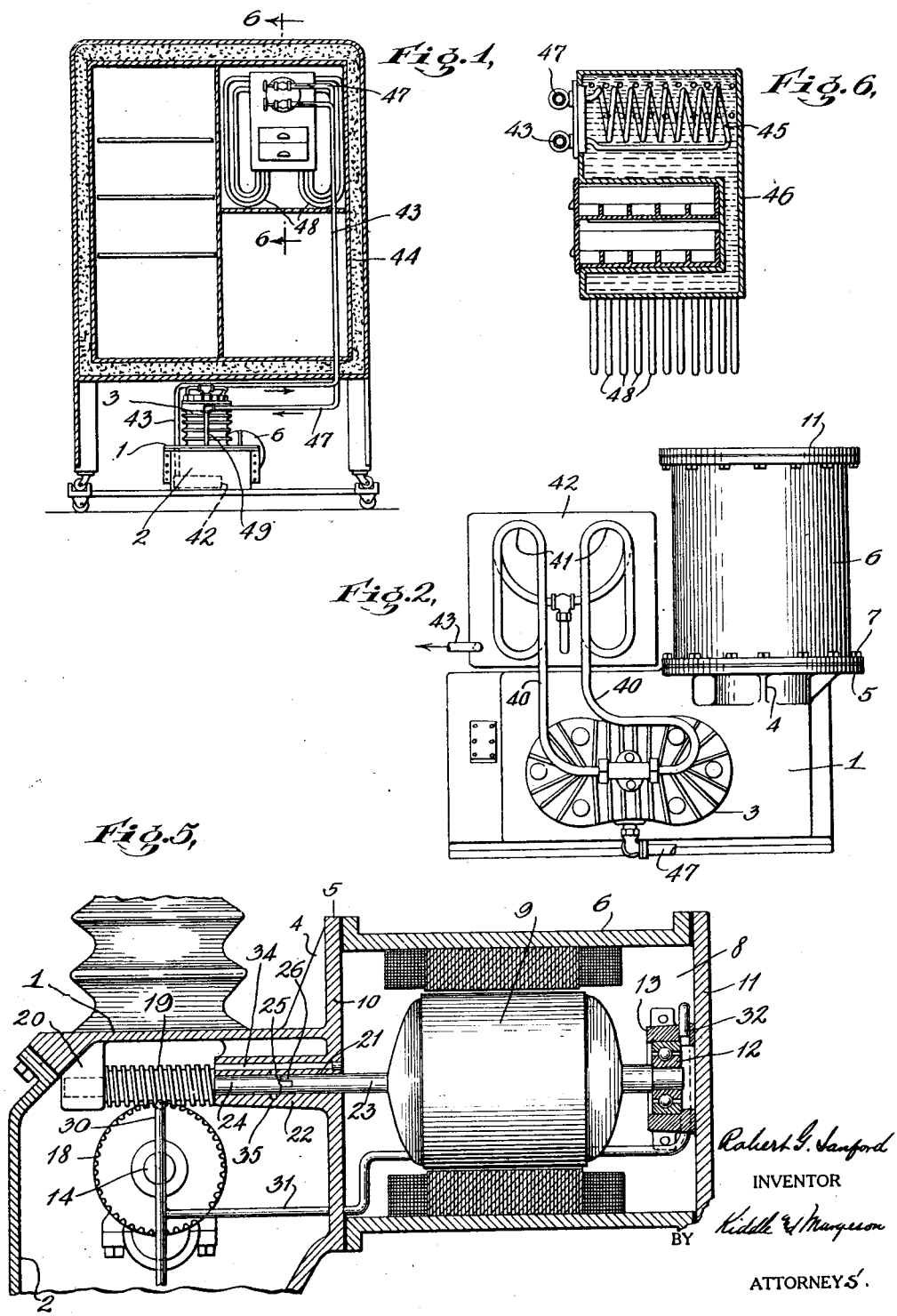

Patented Nov. 29, 1927.

1,650,769

UNITED STATES PATENT OFFICE.

ROBERT G. SANFORD, OF YONKERS, NEW YORK.

MOTOR COMPRESSOR.

Application filed July 22, 1925. Serial No. 45,176.

My invention relates to an improved apparatus particularly adapted, for example, for use in household refrigeration, the same being so constructed and arranged that the apparatus may be readily installed in existing refrigerators or iceboxes.

My improved apparatus which is extremely compact and simple in its construction and may even be placed beneath the ordinary household refrigerator or icebox, thereby adapting my improved apparatus for use in apartments, for example.

My improved apparatus comprises an electric motor and a compressor driven thereby so constructed and arranged as to provide a hermetically sealed unit, in that the casing or frame of the electrical motor hermetically seals the compressor, thereby, in refrigerating work for example, eliminating all danger of the gas or other fluid refrigerant employed escaping into the atmosphere, which permits of installation of the apparatus at any place where household refrigerators are employed.

Provision is also made within the unitary structure above referred to for oiling or lubricating the moving parts of the machine, which provides a structure which is fully automatic in operation and which requires no attention whatsoever on the part of the user.

Other objects of the invention will appear hereinafter.

In the accompanying drawings:—

Fig. 1 is a sectional elevational view of a household refrigerator with my improved apparatus applied thereto;

Fig. 2 is a plan view of my improved apparatus;

Fig. 3 is a side elevational view;

Fig. 4 is a section taken on the line 4—4 of Fig. 3 looking in the direction of the arrows thereon;

Fig. 5 is a section on the line 5—5 of Fig. 4; and

Fig. 6 is a section on the line 6—6 of Fig. 1.

Referring to the drawings in detail, my improved mechanism comprises a compressor and an electric motor for driving the same, the base of the compressor which encloses the crank shaft, etc., for the compressor and comprising an upper section 1 and a lower section 2. It will be seen from Fig. 4 that the upper section 1 of the compressor base provides the compressor cylinder designated 3. The upper section 1 of the compressor base is provided with an integral offset 4 and a flange 5, to which flange I secure the member 6 by bolts 7 or otherwise, the member 6, within which is mounted the armature of the driving motor 9. Cast integral with the upper section 1 of the compressor base is a transverse wall 10.

A plate 11 is provided at the outer end of the member 6 to which it is bolted. It will be understood that gaskets are provided between the flange 4 and the inner end of the motor frame or casing or member 6 as well as between the outer end of motor casing or frame or member 6 and end plate 11, so as to provide a hermetic seal. The leads L of the motor are sealed in the member 6.

The bearings for the driving motor 9—in fact all the bearings in my improved machine—are enclosed within the motor and compressor housing, the outboard bearing 12 for the driving motor being provided by a spider 13 which extends transversely of that part of the motor and compressor housing designated 6, this spider being attached to the walls of this part of the housing. The plate 11 heretofore referred to is exterior of this spider, so that the bearing 12 is completely enclosed.

The compressor shown in detail in Fig. 4 comprises a crank shaft 14, a pair of pistons 15, and connecting rods 16. The crank shaft 14 of the compressor is mounted in bearings 17 which are cast integral with the upper section 1 of the compressor base. The driving connection between the motor 9 and the compressor comprises a worm gear 18 and worm 19. The worm gear 18 is keyed or otherwise fastened to the crank shaft 14, while the worm 19 is mounted in bearings 20 and 21, respectively. The bearing 20 is integral with the upper section 1 of the compressor base. The bearing 21 is also integral with this part of the motor and compressor housing or compressor base and comprises an elongated boss, which I will designate 22 and which is cast integral with the wall 10 heretofore referred to. The connection between the armature shaft 23 of the driving motor and the shaft 24 carrying the worm 19 comprises male and female members 25 and 26, respectively, supported in the bearing 21 for the shafts 23 and 24. This arrangement provides a construction whereby if repairs are to be made to the motor 9 or if access to the motor 9 is desired for any other reason, it is merely necessary to remove the end plate 11, spider 13, and to then pull the motor endwise out of this housing without in any way disturbing the compressor.

I have provided means whereby the bearings for the compressor and the bearings for the motor as well as the bearings for the driving connection between the motor and compressor may be thoroughly lubricated. This means comprises a small force pump 27 mounted within the motor and compressor housing provided in part by the sectional compressor base and carried by one of the bearings 17 for the compressor crank shaft. This pump is driven from the crank shaft, as indicated at 28. The discharge side of the pump is attached to a pipe 29, one end of which lies adjacent the upper face of the worm gear 18 and the worm 19, as indicated at 30, while another pipe 31, which is a branch of the pipe 29, passes through the wall 10 to the bearing 12 of the driving motor, as indicated at 32. The lower section 2 of the motor and compressor housing is partially filled with oil, as indicated by 33, the intake side of the pump 27 communicating with this oil so that when the apparatus is in operation oil will be pumped to the worm and gear and to the bearing 12 for the motor.

As previously mentioned, one end 30 of the pipe 29 lies adjacent the upper face of the worm gear 18, and it will be observed from Fig. 5 that the member 22 providing the bearing 21 is bored longitudinally, as indicated at 34, one end of this bore lying adjacent the end of the worm 19. The bore 34 is provided with a transverse bore or groove 35, which leads directly to the bearing 21. As a result of this construction, the oil which is discharged upon the face of the worm gear 18 will be conveyed or in a way pumped into the bore 34 and along the same lengthwise of the bearing 21 and will flow from there into the bearing so as to insure thorough lubrication of this bearing at all times.

As previously mentioned, the compressor has been shown as a two-cylinder compressor comprising the pistons 15. These pistons are of improved construction, each piston being provided with a wrist pin 36, by which the connecting rod 16 is attached to the piston, each wrist pin being held in place by a pair of piston rings 37, these piston rings lying in the plane of the wrist pin. The walls of the cylinder of the compressor are lubricated by the splash system, the cranks of the compressor splashing the oil 33, which is in the lower part of the compressor base upon the cylinder walls.

At the upper end of the compressor cylinders I provide spring pressed inlet valves 38 and spring pressed outlet valves 39. The outlet valves 39 communicate with two pipes 40 which lead to cooling coils 41, in turn leading to a tank 42 which holds the refrigerant, this tank being attached to the side of the motor compressor housing, as shown on Figs. 1 and 2. The tank 42 is provided with an outlet pipe 43 which leads upwardly through the bottom of the refrigerator 44 to one end of a coil 45 within a brine tank 46 which is mounted in the upper part of the refrigerator, the other end of this coil being connected by a pipe 47 with the intake side of the compressor. The brine in the tank 46, and which is in constant contact with the coil 45, is circulated in a definite path through coils 48. There are two sets of these coils, as shown on Fig. 1, one at each side of the tank. The lower ends of these coils enter the lower part of the brine tank while the upper ends enter the upper part of the tank adjacent the coil 45. This affords a thorough and constant circulation of the brine in a definite path. A pipe 49 has one end passing into the motor and compressor housing while its other end is in communication with the intake side of the compressor.

From the foregoing it will be apparent that my improved apparatus provides a motor compressor which is internally and externally pressure sealed in that the motor frame hermetically seals the compressor so that the motor and compressor are so constructed and arranged as to provide a hermetically sealed unit and hence the interior of the motor and compressor may be placed under vacuum without foreign matter being drawn thereinto from the outside or placed under pressure internally without leakage of the contents thereof.

It will be seen also that self lubrication is provided so that after the machine is once assembled it need not be disturbed for the purpose of lubricating the same. It will be seen also that repairs may be readily made to the machine owing to the manner in which all the parts are assembled.

It is to be understood that various modifications may be made in the construction above described within the purview of this invention.

What I claim is:

1. In a motor compressor, the combination of a compressor and a motor for driving said compressor, said compressor and motor communicating with each other and the end wall of the motor forming a closure for the compressor to provide a hermetically sealed unit.

2. In a motor compressor, the combination of a compressor, a motor for driving the same, the end wall of the motor forming a closure for the compressor to provide a hermetically sealed unit.

3. In combination, a compressor, an electrical motor for driving the same, the casing or frame of said electrical motor hermetically sealing said compressor.

4. In a motor compressor, the combination of a compressor comprising a crank shaft and crank, a motor, driving connections between the motor and crank shaft, said compressor being provided with an offset portion providing part of the motor structure, said motor and compressor being constructed and arranged to provide a hermetically sealed unit.

5. In a motor compressor, the combination of a compressor, a motor, a worm and gear drive from the motor to the compressor and enclosed by the compressor and motor structure, said motor and compressor being constructed and arranged to provide a hermetically sealed unit.

6. In a motor compressor, the combination of a compressor comprising in part upper and lower sections, a motor for driving the compressor, a driving connection between the motor and compressor housed within the motor and compressor structure, bearings for the said driving connection in said upper section, said motor and compressor being constructed and arranged to provide a hermetically sealed unit.

7. In combination, a sealed compressor, a sealed electric motor for driving the same and provided in part by the compressor, a wall within said compressor and motor structure providing an in-board bearing for the motor armature shaft, a coupling at the in-board end of said armature shaft for coupling the shaft to said compressor, a removable out-board bearing for said armature shaft, and an out-board end plate removable independently of said bearings for the motor armature shaft.

8. In a motor compressor comprising an internal pressure sealed motor, a compressor having a hollow compressor supporting base internally pressure sealed comprising upper and lower sections divided along an inclined line, the upper section of said base providing a bearing for the in-board end of the motor shaft.

This specification signed this 21st day of July, 1925.

ROBERT G. SANFORD.